United States Patent [19]

Jones et al.

[11] Patent Number: 5,019,758

[45] Date of Patent: May 28, 1991

[54] GATE OPERATING MECHANISM

[75] Inventors: Richard V. Jones, Reseda; Angel E. Ramirez, Glendale, both of Calif.

[73] Assignee: Court Security Systems, Inc., Van Nuys, Calif.

[21] Appl. No.: 593,769

[22] Filed: Oct. 26, 1990

[51] Int. Cl.[5] .......... H02P 3/00

[52] U.S. Cl. .......... 318/264; 318/272; 318/466; 49/28; 49/118

[58] Field of Search .......... 318/264–272, 318/275, 280–286, 364, 365, 366, 369, 461, 466, 467–470, 59, 62, 63, 65, 66; 49/26–28, 100, 118, 138, 141, 199, 264, 334, 340; 292/341.16, DIG. 15, DIG. 19, DIG. 46

[56] References Cited

U.S. PATENT DOCUMENTS

| | | | |
|---|---|---|---|
| 4,006,392 | 2/1977 | Catlett et al. | 318/283 X |
| 4,108,283 | 8/1978 | Mangel | 49/118 X |
| 4,289,995 | 9/1981 | Sorber et al. | 49/334 X |
| 4,383,206 | 5/1983 | Matsuoka et al. | 49/28 X |
| 4,498,033 | 2/1985 | Aihara et al. | 318/265 X |
| 4,533,901 | 8/1985 | Lederle | 49/28 X |
| 4,713,591 | 12/1987 | McCloskey | 318/257 |
| 4,887,205 | 12/1989 | Chou | 49/26 X |
| 4,916,860 | 4/1990 | Richmond et al. | 49/28 |
| 4,918,360 | 4/1990 | Tanaka et al. | 318/266 X |

*Primary Examiner*—William M. Shoop, Jr.
*Assistant Examiner*—A. Jonathan Wysocki
*Attorney, Agent, or Firm*—Jack C. Munro

[57] ABSTRACT

An opening and closing mechanism for a gate which utilizes an electric motor operating through a electromagnetic clutch. The clutch is to be operated at a significantly increased voltage during the initial period of starting movement of the gate. When the gate is rolling, the voltage through the clutch is significantly decreased to a substantially lower level. During this lower level of movement even a minor amount of resistance applied to the gate will cause the gate to stop thereby avoiding injury to animals (including people) and damage to devices such as automobiles. The gate opening and closing mechanism also includes a separate direct drive mechanism which by-passes the clutch when the gate is in the completely open or the completely closed position. This separate direct drive mechanism functions as a positive lock maintaining the gate in its established completely open or completely closed position when the gate is in either of these positions. A circuit is utilized that provides for improved safety by incorporating improved obstacle sensing devices that prevents the gate from causing injury and/or damage.

7 Claims, 6 Drawing Sheets

GATE OPERATING MECHANISM

BACKGROUND OF THE INVENTION

The field of this invention relates to a gate operating mechanism and more particularly to a mechanism for operating a horizontally sliding gate which is designed to traverse a substantial distance such as between ten and twenty feet. The gate generally is to be located in an outdoors environment and normally has a substantial weight of between three hundred and one thousand pounds.

It is common for electrical motor driven gates to employ a control mechanism that is to either stop the gate or stop and reverse the gate if the gate incurs an unexpected amount of resistance during opening or closing. Outside gates are commonly constructed of a weather resistance material such as wrought iron. It is common for such gates to traverse a roadway of twenty feet or more in width. A gate constructed of wrought iron that is designed to traverse that width inherently has substantial weight. It is common for such gates to weigh as much as one thousand pounds. Operation of the gate can be by any of various input devices such as a hand-held transmitter, sensor loops buried in the roadway, photoelectric eyes, or push buttons mounted some distance from the gate. Convenient gate operation is accomplished by any of the above where it is desired to do so automatically.

Designed within the electronic circuitry of such gates it is common to include safety devices. It is the intent and purpose of these safety devices that if the gate incurs some kind of an obstacle that the gate will either stop or stop and reverse. A typical obstacle would be contacting a motor vehicle or contacting a human being. However, these gates are of a substantial weight and if, for example, you have a thousand pound gate contacting a child, the safety device is commonly just not sensitive enough to cause the gate to stop or stop and reverse without causing injury to the child. If the gate contacts an automobile, there can be some damage to the automobile before the gate will reverse. In actual practice, there are recent incidents, though few, where children have been killed with automatic gates. Also, there are recent instances where even adults have incurred arm and leg damage from such gates. Fortunately, these instances are isolated but they do occur. There are also many occurrences of damage such as motor vehicle damage caused by such automatic gates.

SUMMARY OF THE INVENTION

The primary objective of the present invention is to construct an automatic gate opening mechanism which is exceedingly sensitive and upon the gate encountering any abnormal obstacle situation, the gate will immediately stop and is to reverse if the gate is closing and to remain stopped if the gate is opening.

Another objective of the present invention is to construct a gate opening mechanism which substantially diminishes the possibility of injury and damage thereby significantly reducing insurance liability cost.

The structure of the present invention provides for a mechanism for opening and closing of a gate with this opening and closing to be accomplished electrically and is to be accomplished automatically. Automatic opening and closing is to be accomplished by a human hand, normally by the use of a hand-held transmitter. The movement of the gate is caused by an electric motor which is operated through an electromagnetic clutch. At the time that the gate is initially moved for the first three to five inches of movement, a high level of voltage is conducted through the clutch. Once the gate is moving, this voltage level is significantly decreased to a low level with this low level normally being less than ten percent of the high level. At this low level, the clutch can easily slip and if slippage does occur, such as the gate encountering some form of an obstacle, the electronic control mechanism associated with the gate will immediately stop the movement of the gate. This mechanism will reverse the gate if the gate is closing. If the gate is opening, it will be necessary to manually again activate the hand-held transmitter to cause the gate to proceed in the opening direction. When the gate is fully opened or fully closed, a direct drive mechanism is engaged which by-passes a clutch. The direct drive mechanism establishes a direct driving relationship between the input shaft and the output shaft of the gate opening and closing mechanism. This direct drive mechanism is sufficiently positive to maintain the gate in its open or closed position preventing manual movement of the gate. The control circuitry associated with the gate opening and closing mechanism of this invention includes a timing arrangement which compares the timing of the opening and closing to known opening and closing times. If this timing for any given short period of time is excessive, the gate opening and closing mechanism is stopped.

BRIEF DESCRIPTION OF THE DRAWINGS

FIGS. *7a* and *7b*, when combined, constitute the electrical schematic of the control system utilized to operate the gate opening and closing mechanism of this invention.

DETAILED DESCRIPTION OF THE SHOWN EMBODIMENT

Figure 1:
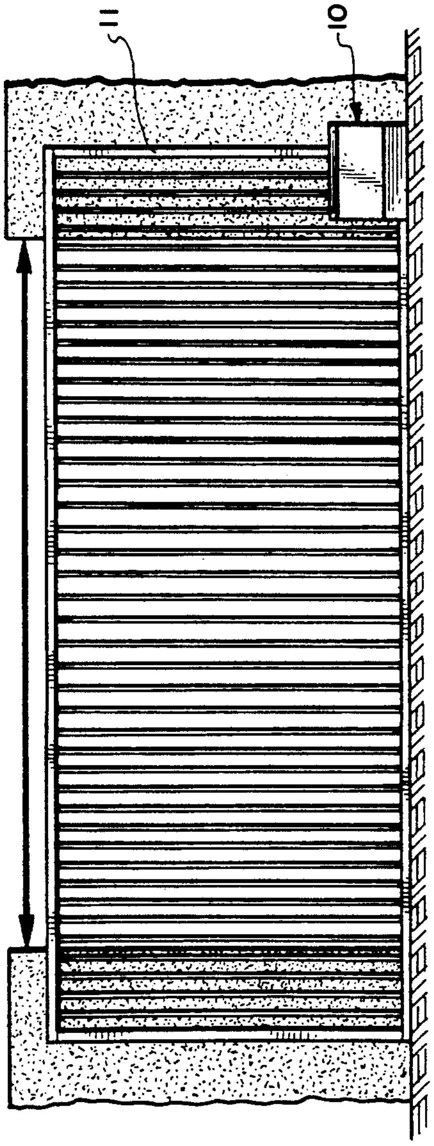
FIG. 1 is an elevational view generally depicting a gate located across an opening where the opening and closing mechanism of this invention is to be utilized.
Figure 6:
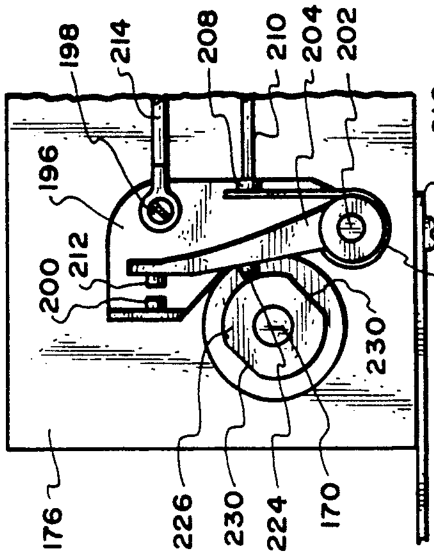
FIG. 6 is a view of the timing mechanism utilized in conjunction with the gate opening and closing mechanism of this invention taken along line 6—6 of FIG. 3.

Referring particularly to the drawings, there is shown the gate opening and closing mechanism 10 of this invention. Mechanism 10 includes a pair of base frame members 12 and 14 which are connected respectively to brackets 16 and 18 which are to facilitate mounting onto a supporting platform 19 in a fixed relationship. Generally, this platform 19 will be located in close proximity to the gate that is to be opened and closed by the mechanism 10.

Fixedly mounted on the base frame members 12 and 14 is a shelf 20. Fixedly connected to the shelf 20 and extending upwardly therefrom is an upstanding wall 22. Actually, wall 22 is shown to be integral to shelf 20 but may comprise a separate structure. Wall 22 is fixedly connected by a series of bolt fasteners 23 to the base frame member 12.

Fixedly mounted on the shelf 20 and totally enclosing the area located directly above the shelf 20 is an enclosing housing 24. Generally, the shelf 20, as well as enclosing housing 24, as well as base frame members 12 and 14, will be constructed of a metallic material such as aluminum, sheet steel, or other similar type of material.

The housing 24 encloses an enlarged chamber 26. Fixedly connected to the housing 24 is an inwardly extending flange wall 28. This flange wall 28 is to connect with the upper free end of the upstanding wall 22. This flange wall 28, the outer surface of the upstanding wall 22 and the inner surface of the directly adjacent housing 26 form a chain compartment 30.

Positioned within the chain compartment 30 is a driving chain 32 which is to connect with the gate 11. Connection of the chain to the gate 11 is deemed to be conventional and need not be specifically described in conjunction with the present invention. The chain 32 is to be looped over a first idler sprocket 34 and under a driving sprocket 36 and then over a second idler sprocket 38. The remaining portion of the chain 32 is connected to the gate 11.

The idler sprockets 34 and 38 are mounted on the wall 22. It is to be noted that the idler sprockets 34 and 38 are diametrically spaced apart relative to the driving sprocket 36. It is also to be noted that the idler sprockets 34 and 38 are spaced a short, substantially identical, distance from the driving sprocket 36. It is the function of the idler sprockets 34 and 38 to maintain engagement of the chain 32 with the driving sprocket 36. The driving sprocket 36, as well as the idler sprockets 34 and 38, are located within the chain compartment 30.

The driving sprocket 36 is fixedly mounted on the outer end of an output shaft 40. The output shaft 40 is rotatably mounted by bushing 42 to a mounting plate 44 and to wall 22. The mounting plate 44 abuts against the wall 22 and is to provide sufficient amount of support for not only the output shaft 40 but also for mounting the first and second idler sprockets 34 and 38. Within the enlarged chamber 26 and located directly adjacent but spaced from the bushing 42 is a timing sprocket 46. This timing sprocket 46 is fixedly mounted by pin 48 onto output shaft 40. Connecting with the timing sprocket 46 is a timing chain 50.

Formed within the output shaft 40 directly adjacent the inner edge of the timing sprocket 46 is an annular groove 52. Within groove 52 is a snap ring 54. Abutting against the snap ring 54 is a bushing 56. This bushing 56 is located at one end of an input shaft 58. This input shaft 58 is hollow with the output shaft 40 being concentrically mounted therein. The opposite end of the input shaft 58 is also mounted about a bushing 60 which is again placed on the output shaft 40. Abutting against the outer end of the bushing 60 is a snap ring 62 which is mounted within an annular groove 64 located within the output shaft 40.

Formed on the exterior surface and in the area of the approximate longitudinal midpoint of the input shaft 58 are a series of gear teeth 66. These gear teeth 66 are to be in continuous engagement with a gear 68. This gear 68 is part of a gear reduction mechanism (not shown) mounted within a gear reduction housing 70. The gear reduction housing 70, and the gear reduction mechanism incorporated therein, is deemed to be conventional. Input into the gear reduction housing 70 is accomplished by means of an electric motor mounted within an electric motor housing 72. There is an output shaft (not shown) from the electric motor of the electric motor housing 72 that is rotatably driven which operates through the gear reduction mechanism (not shown) which ultimately drives the gear 68. This gear 68 can be driven either clockwise or counterclockwise. The input shaft 58 is rotatably mounted within the gear reduction housing 70. It is to be understood that counterclockwise rotation of the gear 68 results in clockwise rotation of the shaft 58 and upon the gear 68 being driven clockwise the shaft 58 will be driven counterclockwise.

The input shaft 58 has fixedly mounted thereon, by means of a key 74, and a sleeve 76. The sleeve 76 has an outwardly extending flange 78. Within that flange 78 and adjacent the peripheral edge thereof are formed a series of holes 80 with therebeing three in number of holes 80. Holes 80 are concentrically arranged relative to the longitudinal center axis of the output shaft 40. Located within each hole 80 is a pin 82. The outer end of each pin 82 is formed into an enlarged head 84. Located between the head 84 and the flange 78 is a spring 86. The function of the spring 86 is to exert a continuous bias on the enlarged head 84 causing such to remain spaced from the flange 78.

The inner end of the pin 82 is mounted on a clutch plate 88. In between the clutch plate 88 and surrounding the pin 82 is a second spring 90. Spring 90 abuts against the flange 78.

The function of the spring 90 is to exert a bias tending to locate the plate 88 in contact with a driving plate 94 on an electromagnetic clutch which is enclosed within clutch housing 96. The structure of the electromagnetic clutch within the clutch housing 96 is deemed to be conventional and again forms no specific part of this invention.

The clutch encased within the clutch housing 96 is to receive electrical energy. The more electrical energy received, the tighter plate 94 is positioned against clutch plate 88. The less electrical energy being supplied into the electromagnetic clutch, the more likely the clutch plate 88 will tend to slip relative to plate 94. As will become apparent further on in the description in relation to the circuitry, when it is required to initially start the gate and because the gate will normally be relatively heavy such as weighing as much as one thousand pounds, a significant amount of starting force will be required. During that particular time, the electromagnetic clutch mechanism will be supplied twenty-four volts which will tightly connect together plates 88 and 94. Once the gate gets started in a rolling movement and a steady rate is continuing, which generally occurs within the first three to five inches of movement of the gate, the voltage to the electromagnetic clutch is significantly reduced to approximately one and one-half volts. However, it is to be understood that if the gate is moving on a slight incline, this one and one-half volts will normally be increased. In other words, the voltage level being supplied to the clutch is deemed to be selectable.

Formed within the inner end of the output shaft 40 is a slot 98. Formed on the inner surface of the flange 78 are a series of splines 100. Pin 102 is located within the slot 98. Pin 102 is connectable with splines 100. This means that there will be a direct transfer of rotative energy between the shafts 40 and 58 and the electromagnetic clutch mechanism will be bypassed. This pin 102 is part of a direct drive mechanism which will be described as follows.

Pin 102 abuts against longitudinally mounted pin 104 with pin 104 abutting against a spring 106. Spring 106 and pin 104 are mounted within internal axially aligned recess 108 formed within shaft 40. It is the function of the spring 106 in conjunction with the pin 104 to exert a continuous bias on the pin 102 tending to locate the pin 102 in the outwardly extending position that is, not connecting slot 98 with the splines 100. This position is clearly shown in FIGS. 4 and 5 of the drawings. The pin 102 is movable within slot 98. The sleeve 112 is actually part of output shaft 40 and is fixedly mounted within the clutch housing 96. The driving plate 94 is fixed to sleeve 112.

Figure 3:
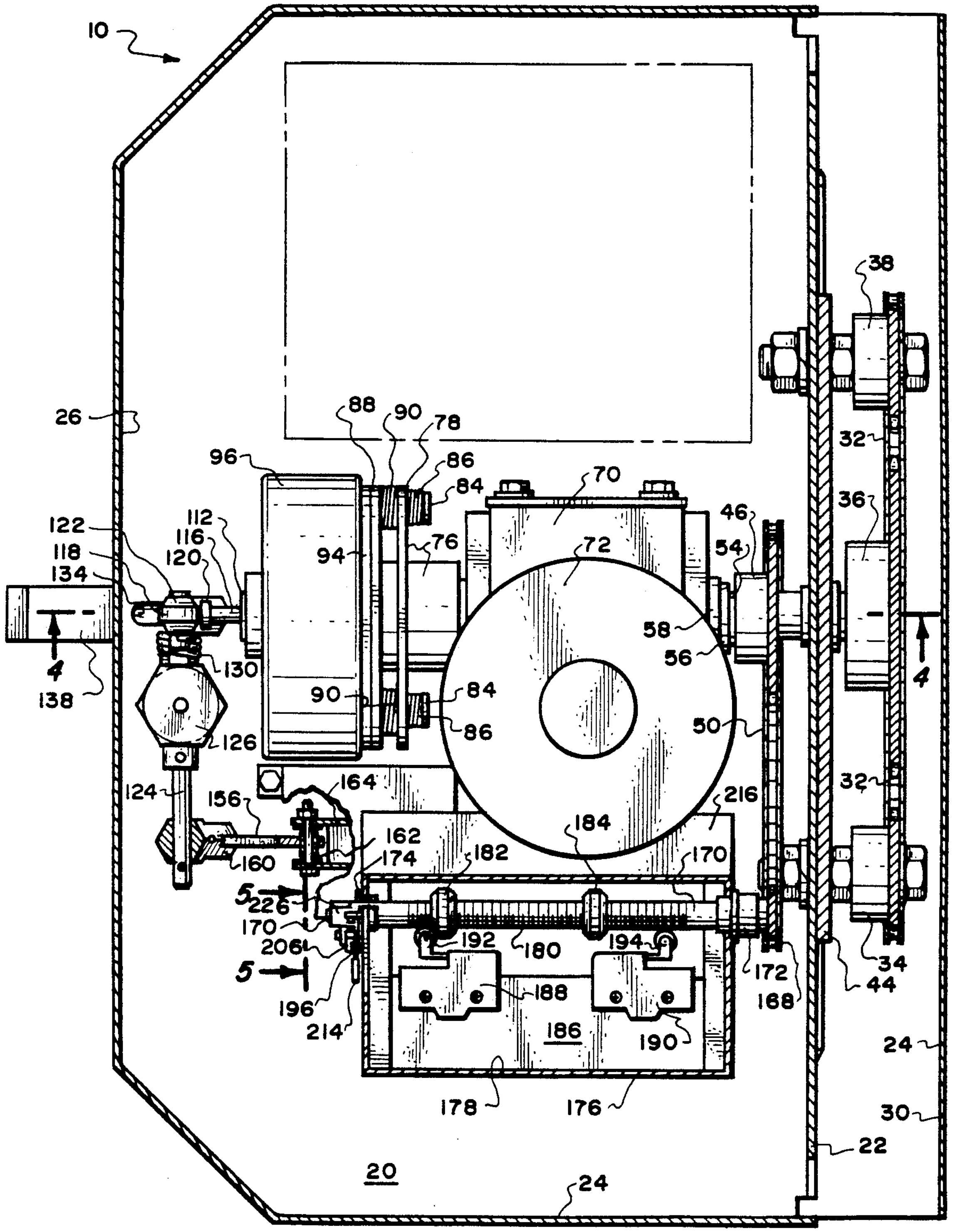
FIG. 3 is a cross-sectional view taken in the direction of a top plan view through the gate opening and closing mechanism of this invention taken along line 3—3 of FIG. 2 showing the timing arrangement and the limit switch arrangement that is utilized to define the limits of movement of the gate opening and closing mechanism of this invention.
Figures 4, 5:
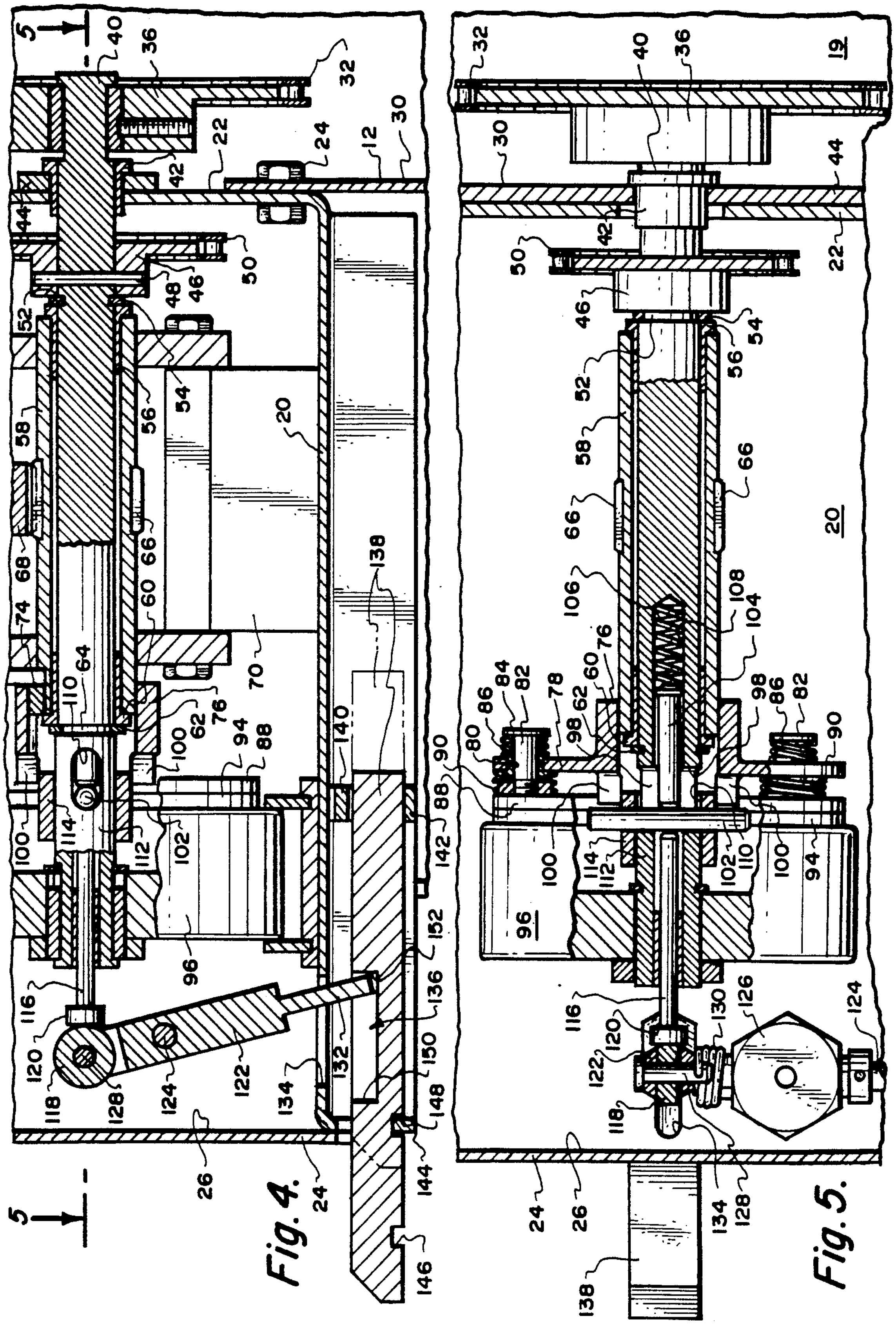
FIG. 4 is a cross-sectional view taken along line 4—4 of FIG. 3 showing in more detail the arrangement between the input shaft and the output shaft utilized in conjunction with the gate opening and closing mechanism of this invention.
FIG. 5 is a cross-sectional view taken along line 5—5 of FIG. 4.

Movement of the pin 102 from the position shown in FIGS. 4 and 5 to the opposite end of elongated slot 110 is accomplished by means of a push pin 116. When the push pin 116 is moved inwardly, the pin 102 will be moved to the opposite end of the elongated slot 110 which will result in a direct drive arrangement being established between the slot 98 and the splines 100. Achieving of the movement of the push pin 116 is by means of a roller 118 which abuts against the enlarged outer head 120 of the push pin 116. The roller 118 is rotatably mounted to one end of a lever 122. Lever 122 is mounted on a shaft 124. Shaft 124 passes through a mounting block 126 which is fixedly mounted on the shelf 20. The roller 118 is rotatably supported on the lever 122 by means of a pin 128. Connecting with the pin 128 is one end of a coil spring 130. The main body of the coil spring 130 is wound around the shaft 124 and is located between the lever 122 and the mounting block 126. The normal bias of the spring 130 is to position the lever 122 so that the push pin 116 is at its inwardly extending position which is opposite to the position shown in FIGS. 2 through 5 of the drawings.

The lower end of the lever 122 includes an outwardly extending arm 132. This outwardly extending arm 132 passes through a slot 134 formed within the shelf 20. Arm 132 is to ride within a groove 136 formed within a pawl 138. The inner end of the pawl 138 slides between a pair of members 140 and 142 which are fixedly mounted to the undersurface of the shelf 20. The outer end of the pawl 138 slides within an opening 144 formed within the shelf 20. Formed within the undersurface of the pawl 138 are a pair of spaced apart slots 146 and 148. Both slots 146 and 148 are to connect with the wall of opening 144.

The pawl 138 is to function as an electromagnetic clutch bypass arrangement. With the pawl 138 located in the position shown in FIGS. 4 and 5 of the drawings, the push pin 116 is in the outwardly extended position which means that any driving connection between the shafts 40 and 58 is to occur through the clutch plates 88 and 94. The arm 132 is positioned adjacent the inner end 152 of the groove 136 and is held in this position by activated solenoid 456. When solenoid 456 is deactivated, arm 132 pivots and abuts against outer end 150 causing the clutch to be bypassed with pin 102 connecting splines 100 and slot 98. The torque of the spring 130 tends to locate the lever 122 in the position with arm 132 abutting against outer end 150 of groove 136. Upon deactivating of solenoid 456, lever 122 pivots so arm 132 abuts outer end 150.

Figure 2:
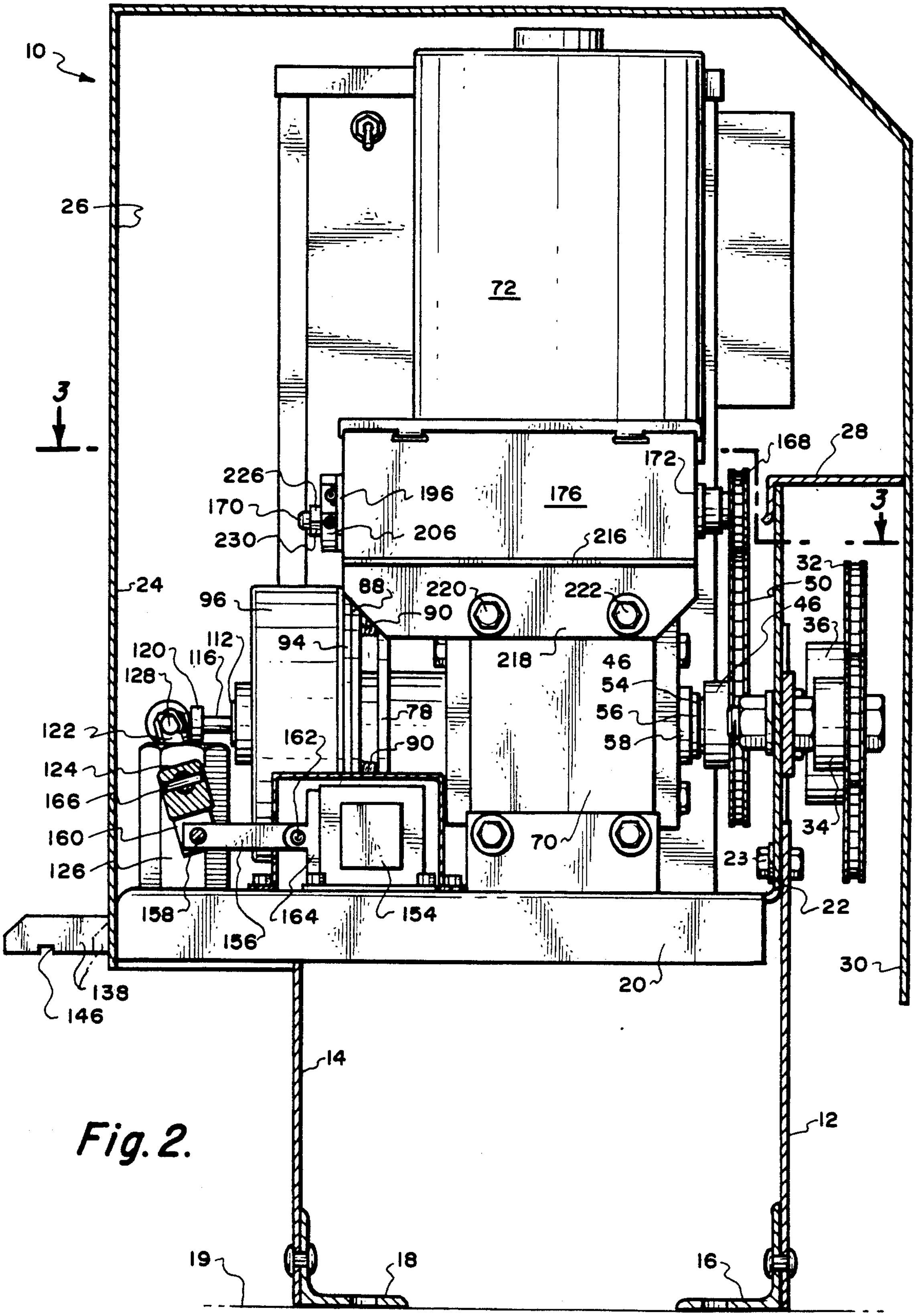
FIG. 2 is a side elevational view of the gate opening and closing mechanism of this invention.

Upon an individual grasping the outer end of the pawl 138 and lifting such permitting the slot 148 to disengage from the opening 144, the pawl 138 can then be moved in an inward position as shown by dotted lines in FIGS. 2 and 3 of the drawings. This results in the outer end 150 of the groove 136 to move against the arm 132 and cause the lever 122 to be pivoted to the position shown in FIG. 4 resulting in the push pin 116 being located outward which in turn will result in the pin 102 not forming a driving engagement between the splines 100 and the slot 98. Again, the pawl 138 is to be located in the inward position only to obtain free manual movement of the gate 11. In other words, pawl 138 comprises a safety feature to be used normally during an emergency or during maintenance.

Because of the gear reduction obtained from the motor contained within motor housing 72 through the gear reduction mechanism contained within the gear reduction housing 70, when pin 102 connects with splines 100 and slot 98, there is a positive lock between the shafts 40 and 58. This positive lock prevents manual movement of the gate 11. This positive locking is to occur automatically when the gate 11 is fully open and when the gate 11 is fully closed. In order to obtain this positive locking, a solenoid 456 mounted within solenoid housing 154 is to be electrically activated when the gate 11 is in the fully open or the fully closed position. When the solenoid 456 is activated, arm 156 is retracted as shown in FIG. 2. Arm 156 is pivotally connected by means of a pivot pin 158 to a lever 160. The arm 156 is also pivotally connected by means of a bolt 162 to the retractable plate 164 of the solenoid 456 located within the solenoid housing 154. The upper end of the lever 160 is pinned by pin 166 to shaft 124. Thus it can be seen that when the plate 164 is extended (and also the arm 156 is extended), which occurs when solenoid 456 is deactivated, the lever 160 is pivoted which causes the shaft 124 to also pivot. This pivoting of the shaft 124 results in similar pivoting of the lever 122 which results in the push pin 116 being moved inwardly which causes pin 102 to produce a continuous direct drive engagement between the slot 98 and the splines 100.

The timing chain 50 is engaged with the timing gear 168. This timing gear 168 is mounted on one end of an elongated shaft 170. Shaft 170 is rotatably mounted by bushings 172 and 174 within a box 176. Box 176 encloses a chamber 178. Elongated shaft 170 passes through the chamber 178.

The exterior surface of the elongated shaft 170 is formed into a series of screw threads 180. Threadably engaged with the screw threads 180 are a pair of nuts 182 and 184. Fixedly mounted on mounting block 186, which is fixed to box 176, are a pair of microswitches 188 and 190. Nut 182 is capable of contacting actuating roller arm 192 of microswitch 188. Nut 184 is capable of contacting actuating roller arm 194 of microswitch 190. Nuts 182 and 184 can be longitudinally positioned by being threaded on screw threads 180. The position of the nuts 182 and 184 determine limits of the opening of the gate 11. In other words, when nut 182 contacts actuating roller arm 192, the microswitch 188 is open and the electrical circuit which causes the sprocket wheel 36 to be rotated ceases and the sprocket wheel 36 stops. The same is true when the nut 184 contacts actuating roller arm 194 of the microswitch 190. Therefore, the microswitch 190 is used to define the limit of the opening movement of the gate 11 with microswitch 188 defining the limit of the closing of the gate 11. The timing chain 50 will always be driven when the driving chain 32 is driven.

Mounted on the exterior surface of the box 176 is a mounting plate 196. Plate 196 is mounted on the box 176 by means of screw fastener 198. The mounting plate 196 has fixedly mounted thereon an electrical contact point 200. The plate 196 has mounted thereon a pin 202. Pivotally mounted on the pin 202 is a contact arm 204. Connected with arm 204 is a leaf spring 206. One end of spring 206 is attached to the arm 204 with the opposite end of the spring 206 being connected to a block 208. Block 208 is fixedly mounted on the mounting plate 196. An electrical wire 210 connects through the block 208 to spring 206. Spring 206 is electrically connected through the arm 204 to electrical contact 212.

An electrical wire 214 is connected by fastener 198 to mounting plate 196. The box 176 is mounted on a shelf bracket 216. Shelf bracket 216 has a right angled flange 218. The flange 218 is fixedly connected by bolts 220 and 222 to gear reduction housing 70. The arm 204 has between its ends thereof and on its exterior surface is mounted a cam pad 224. The cam pad 224 is to be in continuous engagement with a cam wheel 226. The cam wheel 226 has formed thereon diametrically spaced apart flat areas 230.

As the shaft 170 rotates, the wheel 226 also rotates. The spring 206 exerts a constant bias on the arm 204 pressing the contact pad 224 against the exterior surface of the wheel 226. It is to be noted that for every one hundred eighty degree revolution of the wheel 226, the pad 224 comes into contact with a flat area 230. When the contact pad 224 comes into contact with a flat area 230, the contact points 200 and 212 will connect. The spark constitutes a pulse with there being two pulses for every revolution of the wheel 226. This pulsing can be utilized as a timing arrangement as will become apparent further on in the description of the circuitry. It is to be understood that the wires 210 and 214 are to be connected to that circuitry. This circuitry is constructed so that it anticipates that there will be two pulses for every rotation of the wheel 226 within a certain period of time. If for any reason that time is varied, which would occur if the gate 11 encountered an obstacle, then the circuitry would operate to cause the gate 11 to stop or stop and reverse depending upon whether the gate 11 is opening or closing.

The pulses within wire 210 are transmitted through diode 232. The flattened areas 230 permit the contact points 210 and 212 to close for a period of five milliseconds. When a pulse is transmitted through diode 232, light emitting diode 234 is activated indicating that a pulse is being transmitted. Resistor 246 provides a high level of input to operational amplifier 236. Operational amplifier 236 is being supplied a reference voltage of seven and one-half volts continuously. The seven and one-half volt reference voltage is being supplied from line 238. This seven and one-half volts is determined by the size of resistors 240 and 242. If the pulse input through diode 232 to the operational amplifier 236 is higher than the seven and one-half volts being supplied to the operational amplifier 236, a pulse is created at the output line 244 of the operational amplifier 236. Resistor 246 and capacitor 248 function to create a time constant of three hundred forty milliseconds. If the contact points 200 and 212 are open for a longer length of time than the three hundred forty milliseconds, the pulse being supplied to the capacitor 248 will rise above the reference continuously supplied voltage of seven and one-half volts supplied to operational amplifier 236. This would occur if somebody tried to stop the gate 11 and an output would result within line 244 from the operational amplifier 236 in the form of a high level output and due to capacitor 250 and resistor 256, a high pulse is transmitted to AND GATE 254 from capacitor 250. Resistor 256, when combined with capacitor 250, functions to create the pulse that is supplied to AND GATE 254.

Also supplied to the AND GATE 254 is the output of an inverter 258. Inverter 258 is connected to a 555 timer 260. The function of the 555 timer 260 is that when the gate is initially operated, there is no operation of the AND GATE 254 which is approximately one-half second in time. The associated circuitry comprising resistor 262 and capacitors 264 and 266 are for the purpose of achieving that one-half second delay. Inverter 268 is what turns on the 555 timer 260. Inverter 268 receives its signal from the output of OR GATE 270.

The OR GATE 270 receives its input in the form of a signal from either AND GATE 272 or AND GATE 274. AND GATE 272 is activated while the gate 11 is opening and AND GATE 274 is activated during the closing of the gate 11. The output of AND GATE 254 is supplied to both AND GATES 276 and 278. In order for AND GATE 276 to become operative, it must be receiving the output from AND GATE 254. An output from AND GATE 254 occurs only when there is a slow-down in the movement of the gate 11. Also, if this slow-down is occurring as it is opening, AND GATE 276 is receiving a positive potential from AND GATE 272. If the slow-down occurs while the gate is closing, the positive potential from AND GATE 274 is causing an output to occur from AND GATE 278. The output from AND GATE 276 is transmitted to an OR GATE 280. Whenever the OR GATE 280 receives a signal to any or all of the three inputs, its output within line 282 goes high which is transmitted into flip-flop 284. Resistor 281 provides a low potential to the input side of OR GATE 280.

While the positive output is being supplied from OR GATE 280 to flip-flop 284, a negative output in line 286 is created. This negative output is conducted to AND GATE 288. Also, this same pulse is transmitted through line 290 to AND GATE 292.

Whenever there is a low potential within line 286, the output within both lines 294 and 296 will become low and that means there is no signal being conducted to AND GATEs 272 and 274. Therefore, everything stops which means that the gate 11 stops. The gate 11 will remain in the stopped condition unless the gate 11 is commanded to open and then the gate 11 will proceed to open.

When the gate 11 is all the way open, switch 298 is closed. The signal from switch 298 is conducted through light emitting diode 300 through resistors 302 and 304. Capacitor 306 is to eliminate false triggering within line 308. The signal within line 308 is transmitted to a hex Schmitt trigger inverters 310 and 312. The output from inverter 310 is transmitted through line 314 to AND GATE 316. There is no activation at this time of AND GATE 316 but the high signal of line 314 is supplied to capacitor 318. Capacitor 318 cooperates with resistor 320 to create a pulse within line 322. Line 322 is connected into OR GATE 324.

When the gate 11 starts to move to the closed position, switch 406 will open. When the gate 11 is completely closed, switch 406 closes. To open gate 11, it is necessary to have a signal transmitted by some means, such as a hand-held transmitter, to a receiver through line 408 to cause the gate 11 to open. When an open command is received, the output of AND GATE 292 goes high. This output is fed back through line 385 and diode 387 to maintain a positive input level to inverter 380 and lock the gate 11 in the open direction.

The output of OR GATE 324 is transmitted through resistor 326 to the dual retriggerable monostable 328. When the gate is all the way open, monostable 328 will cause the signal within line 330 to have a time delay and this time delay is determined by variable resistor 332, fixed resistor 334 and capacitor 336.

The output from monostable 328 is supplied in the line 338. Within line 338, the output is conducted through capacitor 340 and resistor 342 creating a pulse that is supplied to OR GATE 344. The OR GATE 344 is activated and produces an output within line 346 which is supplied to flip-flop 348. Flip-flop 348 has output lines 350 and 352.

Prior to a pulse being supplied into line 346, line 350 is high and line 352 is low. When a pulse is supplied in line 346 and supplied to flip-flop 348, line 350 goes low and line 352 goes high. The low signal within line 350 is transmitted to AND GATE 292 which prevents any output within line 296. The high signal within line 352 is supplied to AND GATE 288. At this time, two of the four in number of inputs to AND GATE 288 are high which are the inputs within lines 290 and 352.

Line 354 which is an input to AND GATE 288 is also high which is being supplied the output of inverter 356. Inverter 356 is receiving a low signal from inverter 358 which is being supplied a high signal from resistors 360 and 362 and capacitor 357. Fifteen volt DC current is being supplied from line 238 through conductor 364 to resistor 362 and through resistor 304 which maintains a high input to Schmitt trigger invertor 380. Input line 366 becomes high and is supplied to AND GATE 288 since inverter 368 has been receiving a low signal through line 370. The low signal from line 370 is the output from OR GATE 372. The reason OR GATE 372 is low is because the inputs within lines 374 and 376 to OR GATE 372 are both low. The low signal within line 374 is through switch 378 which is receiving the output of a Schmitt trigger inverter 380. When line 374 goes high, resistor 379 insures that a high pulse is produced and supplied to OR GATE 372. The inverter 380 is receiving a high signal from line 364 through resistors 382 and 384 and capacitor 497. There is also a low signal within line 376 which is the output of AND GATE 386. The reason AND GATE 386 has the low output is that on the input side of AND GATE 386 line 388 is low and line 390 is high.

The low output from OR GATE 372 is inverted by inverter 368 to cause the AND GATE 288 to produce a high signal within line 294. This activates transistor 392 which transfers a low potential to the power board through line 394. Resistor 397 causes a low potential to be supplied to base of transmitter 392 to insure transmission is fully off when not conducting. Resistors 393 and 395 are current limiting. LED 399 is on when transistor 392 is conducting.

When transistor 392 is conducting, the output from AND GATE 274 is delayed through resistor 396 and capacitor 398 delaying the input to operational amplifier 400. The output of the operational amplifier 400 is conducted through variable resistor 402 with this resistor to be used to adjust the operating voltage of the clutch input line 404. The voltage within line 404 is to be adjusted to just be sufficient to have the gate 11 move once it is moving. This adjustment will vary from one installation to the other. In instances of a lightweight gate 11, a lesser voltage is required. In the instance of a heavier gate 11, a greater voltage will be required. A typical range of the voltage within line 404 will be from one and one-half to twenty volts.

The user is to place switch 378 to either connect with line 374 or line 410. When switch 378 is connecting with line 374, the signal is transmitted through OR GATE 372, line 412, line 370, to inverter 368 where the signal is inverted within output line 366 which produces a low signal being transmitted to AND GATE 288. When this happens, AND GATE 288 is disabled and there can be no output from the AND GATE 288 and hence no activation of AND GATE 274.

At the same time, the output of OR GATE 372 is transmitted to OR GATE 414 which creates a pulse through capacitor 416 and resistor 417. This pulse is transmitted through line 418 to flip-flop 348 and to OR GATE 420. That means that both flip-flop 348 and OR GATE 420 are receiving a high signal. The flip-flop 348 flips which causes line 350 to become high and line 352 becomes low.

Now going back, when line 418 becomes high, OR GATE 420 produces a high output within line 422 which is supplied to flip-flop 284. The outputs of flip-flop 284 are reversed producing a high in line 286 which is transmitted to AND GATES 288 and 292. This causes AND GATE 292 to produce a high that is supplied to AND GATE 272. At this time, there is a high output produced from AND GATE 272 which goes through resistor 427 to the base of transistor 424 supplying a low through resistor 425 to light emitting diode 426 which is located within line 428. Resistor 429 is to insure a low potential to base of transistor 424 and resistor 397 will insure a low potential to transistor 392. Line 428 connects into the power board shown in FIG. 8. The same signal that is being transmitted to transistor 424 passes through resistor 430 and capacitor 432 which is delayed (three hundred thirty milliseconds) prior to being supplied to operational amplifier 434. This produces an appropriately delayed high output from the operational amplifier 434 which is transmitted through variable resistor 436 mounted within line 438. The variable resistor 436 must be adjusted to the desired operating voltage for the clutch.

It is to be noted that the output within line 438 is low. When the gate is not moving, the output of operational amplifier 434 is high. This high is transmitted through variable resistor 436 and line 404 to a regulator 440 of the power board shown in FIG. 8. The regulator 440 is preset along with the values of resistors 442 and 444 to establish a twenty-four volt output in line 446 which is supplied to the electromagnetic clutch mounted within the clutch housing 96. That is the standby voltage for the clutch. When there is a low signal from the operation amplifier 434 or operational amplifier 400, the voltage output within line 404 is controlled by the settings established respectively by variable resistors 436 and 402. Now the voltage in the clutch will drop to some preset level which will be determined according to a particular installation. A typical droppage would be about to one and one-half volts on level ground. If perchance as the gate is closing, it is moving upwardly on a slight incline, a significantly higher voltage will be required. In that situation, the variable resistors 402 and 436 will be adjusted accordingly.

The delay that is caused by capacitor 432 and resistor 430 causes the standby voltage to stay at twenty-four volts for the first three or four inches of gate 11 movement. At the beginning of this first three to four inches of gate 11 movement, the voltage within line 404 would be at this twenty-four volt level. During this first three to four inches of gate 11 movement, a high is produced from AND GATE 272 and line 448. This high signal is transmitted into OR GATE 270 and AND GATE 276. OR GATE 270 produces a high output transmitted through diode 450 producing a low output from operational amplifier 452 through resistor 457 within line 454. When the high output of OR GATE 270 goes low, resistor 451 and capacitor 453 maintains the high signal into operational amplifier 452 for a short time (approximately three seconds). This causes the solenoid 456 in solenoid housing 154 to remain activated insuring that engagement between slot 98 and splines 100 by pin 102 does not occur prematurely. The low signal within line 454 is supplied through resistor 457 to turn on the solenoid 456 which is shown on the power board of FIG. 8. This solenoid 456 is activated at the same time as the signal is transmitted within line 428. When this solenoid 456 is operated, the only connection between the input shaft 58 and the output shaft 40 is through the use of the electromagnetic clutch whose operation is produced through the frictional connection of plates 88 and 94. Now the gate 11 is opening and switch 406 opens, what happens when switch 406 opens has been previously discussed.

When the gate 11 is opening, if an obstacle is detected such as through the use of a photocell, the gate 11 will continue to open. In other words, the photocell will have no effect on the opening moving of the gate 11. If there is interference in the opening movement, this is compensated by an internal safety device within the circuit which was previously described in relation to the time delay which is accomplished by resistor 246, capacitor 248 and operational amplifier 236. As the gate 11 is opening, as previously mentioned, both switches 298 and 406 are open. When the gate 11 is completely open, switch 298 closes which shuts down the operation of the motor contained within motor housing 72. The solenoid 456 moves to its at-rest position which causes pin 102 to connect between slot 98 and splines 100.

Now it is desirable to close the gate 11. The gate 11 can close automatically after being open for a set period of time, such as a preset period of time between two seconds and two and one-half minutes. Varying of this period of time is achieved by adjusting of variable resistor 332. Once the desired time period has been selected, the gate 11 will automatically close when switch 458 is in the open position. The opening of switch 458 is to be selected initially at the time of installation of the mechanism 10.

Now let it be assumed that switch 458 is closed so there will be no automatic closure of the gate 11. Switch 378 is then connected to line 410. A high potential will then be supplied to flip-flop 348. The flip-flop 348 produces a high output within line 352 and a low output within line 350. At this time, all inputs to AND GATE 288 are high which results in the production of a high output from AND GATE 288 which is supplied to AND GATE 274. This produces a high output from AND GATE 274 which will activate the transistor 392 producing an output signal within line 394 which will result in the gate 11 moving to the closed position.

When the gate 11 is closing, there is to be incorporated some kind of a safety apparatus to detect a physical object in the path of the gate 11. One example of this would be a photocell. If the photocell detects an object which produces a signal, this signal will be supplied to line 462 which will turn on light emitting diode 460. This signal is supplied to a filtering resistor 464 and capacitor 466 providing a low input signal to the input of inverter 468. The resistor 470 is there for primarily the purpose of insuring that there is a high signal transmitted to inverter 468 when no signal is supplied to line 462. The inverter 468 inverts this low signal to a high signal which is then transmitted to AND GATE 386. There is also a high signal being transmitted through line 390 to AND GATE 386 and the reason for this is that switch 406 is in the open position. The output of AND GATE 386 becomes high and is transmitted to OR GATE 372 which produces a high within line 412. Within line 412 the high signal is inverted by inverter 368 producing a low which is supplied to AND GATE 288. This deactivates AND GATE 288 which means that there is no signal being transmitted trying to close the gate 11. The low output signal from AND GATE 288 is transmitted through capacitor 472 to AND GATE 474. The output of AND GATE 474 goes low for a millisecond which triggers monostable 476. This results in the production of a low within line 478 for a length of time of this being low being determined by capacitor 480 and resistor 482. After that established period of time, line 478 goes high and this high is transmitted to both AND GATES 272 and 274. Both of the inputs to AND GATE 272 are high which means the output of AND GATE 272 within line 484 is high which triggers transistor 424 and the gate 11 opens. The high signal within line 484 continues until the gate 11 is in the completely open position. In this position, the gate 11 will remain in this open position until a command is received to close the gate 11. The AND GATE 474 can be activated also from line 269 through capacitor 471.

Let us assume now that the gate 11 is closed and switch 458 is open and switch 378 is connected to line 374. An open command is received in the line 408 which will be conducted as previously discussed to produce a high output from AND GATE 292. The gate 11 will continue to open until it is completely open at which point switch 298 closes. Again, as previously discussed, closing of switch 298 results in stopping of the gate 11. When switch 298 is closed, a high output is produced in line 314 which produces the delay cycle as previously discussed in relation to the monostable 328. Now let it be assumed that the gate 11 is open and a second vehicle is approaching the gate 11 and the individual in that vehicle supplies another open pulse in the line 408. This will result in restarting of the monostable 328 so that the gate 11 will remain open the entire time that has been pre-established by the monostable 328. This will prevent the gate 11 from closing prematurely on the second party that may be following the first party.

It is to be kept in mind that during opening of the gate 11, if for some reason the gate 11 stops, it stays stopped. When closing the gate 11, if the gate 11 stops, it will automatically restart itself, reversing and moving toward the open position. When the gate 11 is closing, there is a delay caused by monostable 476 prior to the gate 11 moving toward the open position.

The stop line 486 through light emitting diode 488 is to be used to stop the gate 11 in any position whether opening or closing or if the gate 11 is even completely open or completely closed. Supplying of a negative pulse in the line 486 through resistor 505 reduces the high to a low into inverter 490. Resistor 501 supplies a high to input of inverter 490 on stand-by condition. The output of inverter 490 within line 492 becomes high which is transmitted to OR GATE 280. The output of OR GATE 280 and line 282 goes high which activates the flip-flop 284. This is a production of a low signal within line 286 which results in no output of AND GATES 288 and 292.

Figure 7A:
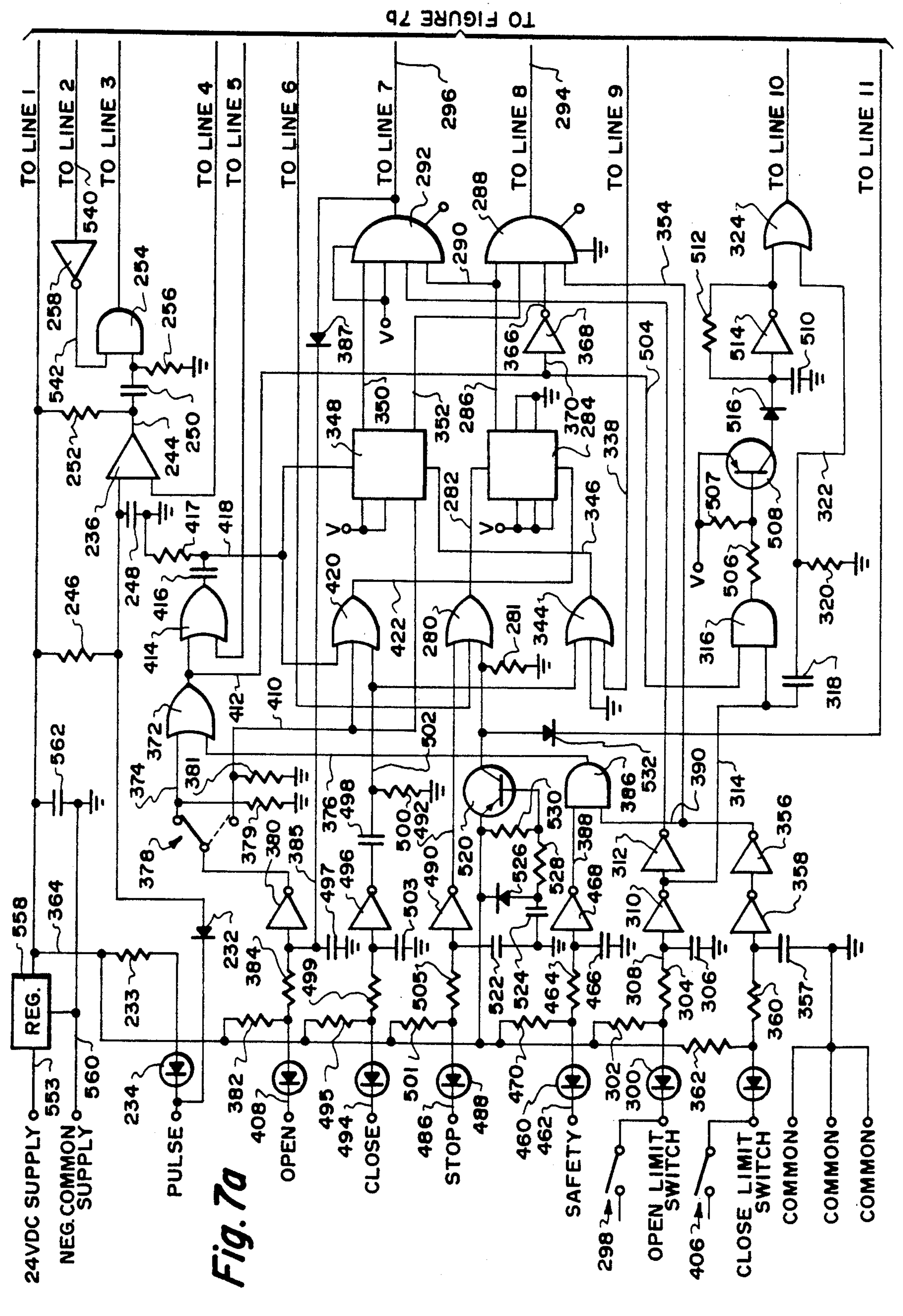
Figure 7B:
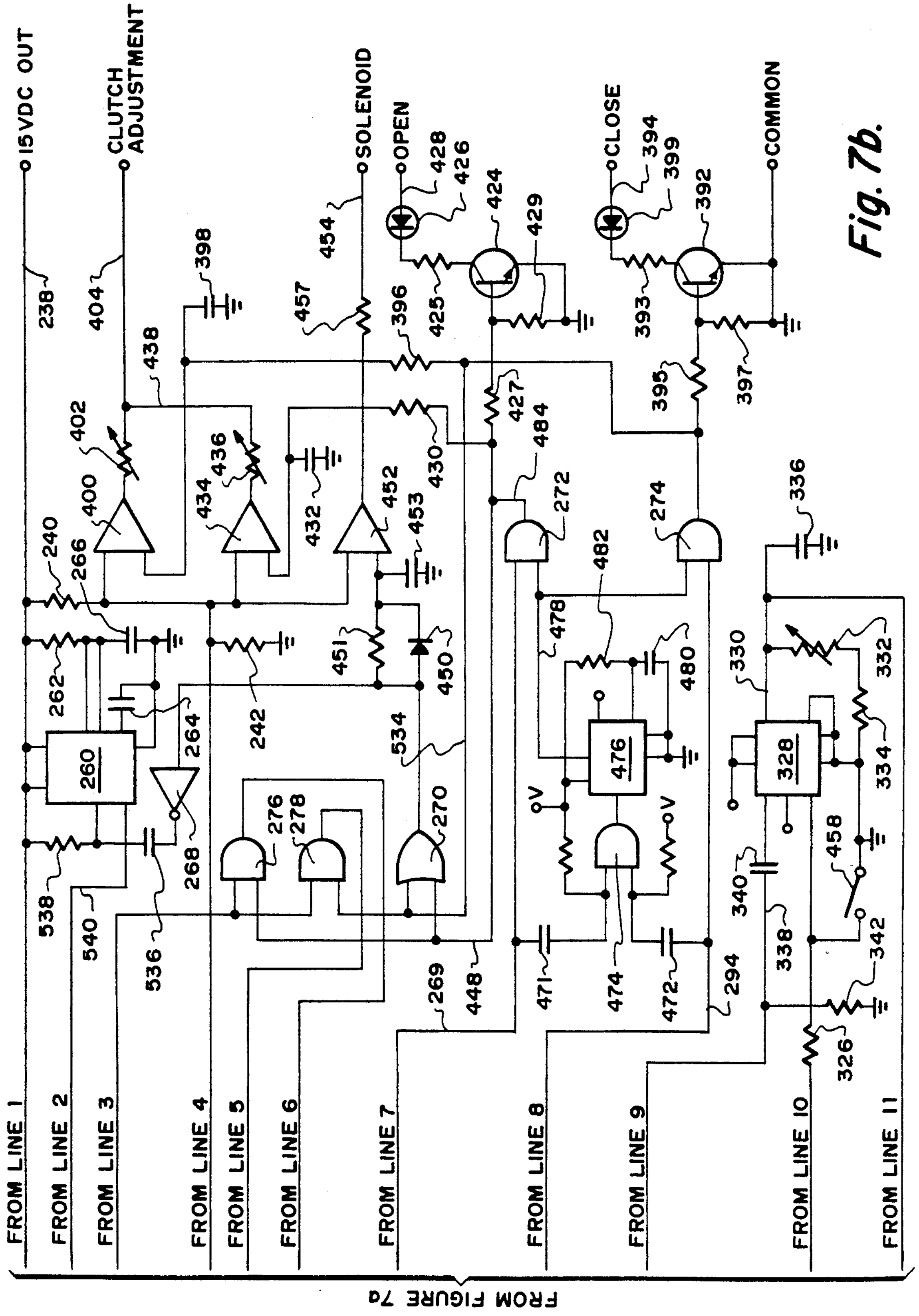

The circuitry shown in FIGS. 7*a* and 7*b* also includes a close line 494. Line 494 is to receive a signal through the use of a manually operated button (not shown). Activation of this button will produce a low within inverter 496. This low signal is filtered by filtering resistor 499 and capacitor 503. The high output from inverter 496 within line 502 is transmitted through capacitor 498 and resistor 500 to both OR GATE 420 and OR GATE 344. From OR GATE 420, the signal is transmitted through line 422 causing activation of flip-flop 284 which produces a high signal within line 286 which then causes a high signal to be transmitted to both AND GATES 288 and 292. At the same time, the flip-flop 248 is activated producing a high in line 352 and a low in line 350. The net result is the output of AND GATE 288 goes high but the output of AND GATE 292 still remains low. With AND GATE 288 going high, AND GATE 274 produces an output which proceeds as previously discussed through transistor 392 to close the gate 11.

When the gate 11 is all the way open, the open limit switch 298 is closed. Switch 378 will be located connecting with line 410. Line 410 connects to flip-flop 348. Line 350 will become high and line 352 will become low. Now all high signals are being supplied to AND GATE 292 which produces a high output within line 296 which is transmitted to AND GATE 272. As a result, transistor 424 is activated and the gate 11 is moved to the open position.

When the gate 11 is open and switch 458 is open, the timer is "on". A command at line 408 to open the gate 11 or a command at line 462 will cause a high output to be produced from OR GATE 372. The output line 412 from OR GATE 372 connects with line 504. A high signal in line 504 connects to AND GATE 316. A second high signal is being transmitted to AND GATE 316 through line 314. As a result, there will be a high output from AND GATE 316. This high output is transmitted through resistor 506 turning transistor 508 "off". Resistor 507 causes a high to be supplied to the base of transistor 508 to insure that transistor 508 does not conduct when "off". When transistor 508 is "off", capacitor 510 and resistor 512 will generate pulses in conjunction with inverter 514. The pulses from inverter 514 are supplied to OR GATE 324 which will produce a similarly pulsed output. These pulses will be used to reset monostable 328.

Diode 516 comes into play only when it is receiving a high signal. This causes the high at input inverter 514 which produces a low output therefrom. This will now stop the generation of pulses produced by the inverter 514. Now the delay selected by the monostable 328 will be initiated and after the appropriate delay the appropriate output signal will be transmitted within line 338. Line 338 connects with OR GATE 344 which will cause OR GATE 344 to be activated which will now start the gate 11 to move to the closed position.

Transistor 520 has been added so that when the gate 11 is first activated, that is first plugged in and the power supplied to it initially, that it will not be moving in either direction according to some pre-supplied demand. The transistor 520 works through capacitors 522 and 524 and diode 526 and resistors 528 and 530 to produce a low to the base of the transistor 520. This low results in the transistor 520 being turned "on" providing a high input to OR GATE 280 which then provides a high input to flip-flop 284 to flip line 286 to a low. Therefore, there will be no movement of the gate 11 in either direction producing a high output from transistor 520 and transmitting this high output through diode 532 into monostable 328. There is no automatic closing activation which will cause the gate 11 to move to the closed position automatically. The circuitry transistor 520 will prevent, for a five second period of time, any command causing activation of anything and this occurs only at the time when it is first activated.

Whenever there is a command from AND GATE 272 which is transmitted into line 448, or from AND GATE 274 which is transmitted into line 534, there results an output from OR GATE 270 which provides a high to inverter 268. This produces an output from inverter 268 in the form of a low through capacitor 536 in conjunction with resistor 538 through the 555 timer 260. The timer 260 produces an output within line 540 which is a high signal being transmitted to inverter 258 which produces a low at its output within line 542. The low within 542 is transmitted to AND GATE 254. After the time has passed that was previously established by timer 260, the output within line 540 goes low which results in a high output from inverter 258 which will produce a high output from the AND GATE 254 if it receives a second high output within line 244. The reason for this is that during the initial start-up time, no timing consideration is given to the electrical contact points 200 and 212 which will cause the gate 11 to stop functioning. The timing period set by timer 260 would be equal to the amount of time that it takes to have the gate 11 get up to speed. This particular delay will be effected by the weight of the gate 11 as well as its environment of installation.

Figure 8:
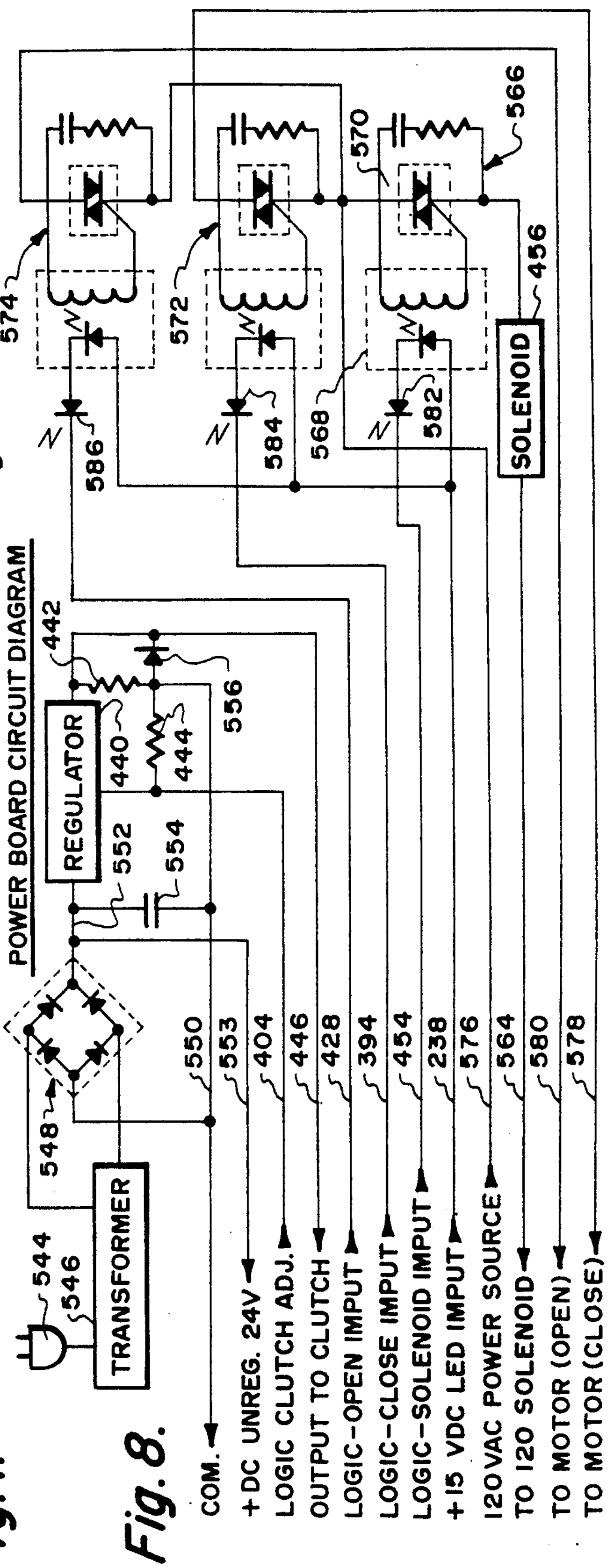
FIG. 8 is the power board circuit diagram which operates the circuit of FIGS. *7a* and *7b*.

Referring particularly to FIG. 8, there is shown the circuit diagram for the power board which is to be utilized in conjunction with the circuit board shown in FIGS. 7*a* and 7*b*. The power board of FIG. 8 is to receive power from a conventional source such as by means of a conventional plug 544 that is to connect with a conventional 115 V power source. From the plug 544, the voltage is decreased to twenty-four volts through the use of a transformer 546. From the transformer 546 the now twenty-four volt power source is rectified from alternating current to direct current by means of a bridge rectifier 548. The bridge rectifier 548 supplies a common negative to line 550. The positive output line 552 from the bridge rectifier 548 is connected to the ground line 550 by means of a capacitor 554. The capacitor 554 functions as a filtering capacitor. The output line 552 is connected to a regulator 440. The function of the regulator is to regulate the power to the clutch, that is to supply in essence a substantially constant voltage to the clutch. From the regulator, power is supplied to the clutch as previously mentioned by line 446. Associated with capacitors 442 and 444 is a diode 556. The function of the diode is to protect the regulator 440 from feedback in the form of inductance generated by the windings within the clutch.

It is to be understood that the twenty-four volt output from the bridge rectifier 548 is to also be supplied through line 553 of the main circuitry shown in FIGS. *7a* and *7b*. A regulator 558 is utilized to decrease the voltage from the twenty-four volts to fifteen volts within line 238. There is also utilized a negative common line 560 electrically grounding regulator 558. Connected between the ground line 560 and line 238 is a filtering capacitor 562.

The solenoid 456 is connected by line 564 to an electronic switch 566. This switch 566 is comprised of an optoisolator 568 and a triac 570. Basically, the switch 566 takes the place of a conventional relay.

A switch 572, which is similar to switch 566, is utilized to initiate activating of the gate 11 in the closing position. A similar switch 574 is utilized to activate the gate 11 in the opening position. The switches 566, 568 and 572 are all to be supplied conventional 115 V volts (AC) through line 576. The output of switch 572 is supplied into line 578 and the output of switch 574 is supplied into the line 580. Associated with optoisolator 568 is the light emitting diode 582. Associated with the switch 572 is the light emitting diode 584, and associated with the switch 574 is a light emitting diode 586. Fifteen volt current is to be supplied to light emitting diodes 582, 584 and 586 through input line 238.

What is claimed is:

1. A gate opening and closing mechanism for moving a gate between a closed position and an open position, said mechanism comprising:

an output shaft adapted to be connected to the gate to cause moving of the gate;

an electrically operated motor, a clutch being operated by said motor, said output shaft being connected to said clutch, said clutch being capable of assuming multiple levels of power engagement to thereby use just a sufficient amount of force required to move the gate according to the conditions present at the given time; and a direct drive mechanism associated with said clutch, said direct drive mechanism being movable between an engaging position and a disengaging position, with said direct drive mechanism in said engaging position said output shaft being in a direct drive relationship with said motor, with said direct drive mechanism in said disengaging position said output shaft being connected to said motor only through said clutch.

2. The gate opening and closing mechanism as defined in claim 1 wherein:

said multiple levels of power engagement being adjustable.

3. The gate opening and closing mechanism as defined in claim 2 wherein:

said multiple levels of power engagement comprising two in number.

4. The gate opening and closing mechanism as defined in claim 3 wherein:

said multiple levels of power engagement comprising a high level and a low level, the power of said low level being less than ten percent than the power of said high level, said high level only being used during starting movement of the gate, said low level being used during the remainder of the movement of the gate.

5. The gate opening and closing mechanism as defined in claim 1 wherein:

there being an input shaft between said motor and said clutch, said output shaft being mounted within said input shaft.

6. The gate opening and closing mechanism as defined in claim 5 wherein:

said output shaft having an at-rest position, with said output shaft in said at-rest position said output shaft being in said direct drive relationship with said motor.

7. The gate opening and closing mechanism as defined in claim 1 wherein:

there being an electronic circuit being connected between said motor and said output shaft, said electronic circuit utilizing a cam timing device, rotational movement of said output shaft to be compared to the time of actual rotational movement determined by said cam timing device, if the time of rotational movement of the output shaft exceeds known pre-established limits of time the gate is caused to be operated in the reverse direction.

* * * * *